United States Patent [19]

Kuliev et al.

[11] 4,277,390

[45] Jul. 7, 1981

[54] POLYMERIC COMPOSITION

[76] Inventors: Aladdin M. O. Kuliev, ulitsa B. Sardarova, 8, kv. 21; Tokhrul A. O. Kadyrov, prospekt Lenina, 11, kv. 7; Gjuloglan G. O. Gaibov, Zykhskoe shosse, 30, kv. 11, all of Baku; Anatoly G. Sinaisky, ulitsa Plekhanova, 41, kv.20; Valentina N. Matiyasevich, ulitsa Krasnoputilovskaya, 59, kv.27, both of Leningrad, all of U.S.S.R.

[21] Appl. No.: 120,848

[22] Filed: Feb. 12, 1980

[30] Foreign Application Priority Data

Feb. 12, 1979 [SU] U.S.S.R. .................. 2723462

[51] Int. Cl.³ .................................... C08L 63/02
[52] U.S. Cl. ......................... 260/37 EP; 528/103
[58] Field of Search ............. 260/37 EP; 528/99, 103

[56] References Cited

U.S. PATENT DOCUMENTS 3,299,169  1/1967  Smith ..................... 528/103

*Primary Examiner*—Lewis T. Jacobs
*Attorney, Agent, or Firm*—Fleit & Jacobson

[57] ABSTRACT

A polymeric composition comprises a mixture of components taken in the following ratio, in parts by weight:

| | |
|---|---|
| (polypropylene glycol)diurethanediepoxide | 100 |
| diglycidyl ether of bisphenol A | 10 to 150 | curing agent which is a mixture of m-phenylenediamine and aniline taken in the weight ratio of 0.9 to 1:1.13 to 40.

9 Claims, No Drawings

POLYMERIC COMPOSITION

BACKGROUND OF THE INVENTION

1. Field of the Invention

The present invention relates to the production of polymeric epoxy compositions and more specifically to the production of high-molecular polyepoxides by way of preparing cross-linked polymers with the use of nitrogen-containing compounds.

The invention is of particular advantage where such requirements upon a polymeric composition are imposed as high tackiness to base materials, high impact strength, good heat resistance, good chemical stability, and good elasticity so as to level down irregularities on base materials and to reduce internal strains, as well as long duration time of curing.

Most advantageously the invention can be used for protecting metals from corrosion, particularly for anticorrosion covering of heat supply lines, oil pipelines, and gas pipelines, wherein the product being conveyed has a temperature of 80° to 120° C.; also, due to high tackiness to iron and concrete and due to good elasticity, the composition of the present invention may be used as a sealing compound for sealing joints and as a glue of high adhesive power.

2. Description of the Prior Art

Epoxy resins are known to be extensively used for preparing corrosion-resistant and wear-resistant sealing compounds and glues which possess high mechanical strength and good chemical stability. Due to high density of their cross-linking, the amine-solidified epoxy resins based primarily on diglycidyl ether of bisphenol A are brittle substances of a glass transition temperature of higher than 20° C.

In practice, however, high hardness and high strength of the amine-solidified epoxy resins are not always necessary. Instead, it is desirable that these resins be of high elasticity and low brittleness. Various methods are taken advantage of to make the resins more elastic and less brittle, but the most of these methods can not be regarded as satisfactory.

Known in the art are epoxy compositions comprising various elastomers with epoxy groups, such as polydienurethane epoxy resin and mixtures thereof with diglycidyl ether of bisphenol A as described in USSR Inventor's Certificates Nos.: 231,796; 316,698; 537,096. Though elastic, these compositions possess low strength and very low tackiness to steel.

It is to be noted that both liquid curing agents (aliphatic diamines and low-molecular polyamides as well as derivatives thereof) and crystalline curing agents (aromatic diamines and derivatives thereof) are used in the above epoxy compositions. From the technological point of view, it is most advisable to employ liquid curing agents, but the properties of polymeric compositions cured therewith are worse than those of the compositions cured with crystalline curing agents.

It is quite clear that the crystalline state of the aromatic diamines makes it difficult to uniformely distribute the components of a composition. Various methods are used to improve the distribution of these components. Among these methods are such as dissolving aromatic diamines in a solvent, melting these aromatic diamines or using them with various liquid modifiers. However, such methods can not always be taken advantage of.

Attemps have been made to liquefy the aromatic diamines without dissolving them in solvents. It is known that in order to cure epoxy compositions, use may be made of liquid eutectic mixtures of the aromatic diamines, such as a mixture of 60–75% m-phenylenediamine and 25–40% methylenediamine. The eutectic mixture is a liquid which can be added to epoxy compositions without any additional operations. However, the properties of the polymeric compositions cured with conventional eutectic mixtures are practically the same as those of the polymeric compositions cured with these curing agents separately. (H. Li, K. Nevill, Spravochnoye rukovodstvo po epoksidnym smolam, Moscow, Energia Publishers, 1973, p. 99).

Known in the art is a composition comprising (polypropylene glycol diurethanediepoxide, diglycidyl ether of bisphenol A, and a curing agent. The curing agent may be polyethylene polyamine and 3,3'-dichlor 4,4'-diaminediphenylmetane (MOCA) (see P. E. Gofman, A. G. Sinayskiy, Novie materiali na osnove epoksidnykh smol, ikh svoystva i oblasti primenenia, part I, Leningrad, LDNTP, 1974, pp. 45–47).

By means of combining (polypropylene glycol) diurethanediepoxide with diglycidyl ether of bisphenol A in various weight ratios and in the presence of the above curing agent it is possible to obtain a wide variety of materials, from hard to highly elastic. However, if (polypropylene glycol)diurethanediepoxide is in excess, the above composition possesses low adhesive power. As the content of diglycidyl ether of bisphenol A is increased, the adhesive power increases as well, but at the same time the composition becomes more brittle. In addition, this composition is characterized by a rather low heat resistance.

SUMMARY OF THE INVENTION

The principal object of the present invention is to provide a polymeric composition which, in addition to high adhesive power and high strength, possesses good elasticity.

Another object of the invention is to increase the degree of filling of the polymeric composition with a mineral filler.

One more object of the present invention is to upgrade the heat resistance of the polymeric composition.

Still another object of the invention is to increase the moisture resistance and chemical stability of the polymeric composition.

Another object of the invention is to enhance the specific resistance of the polymeric composition.

One more object of the invention is to increase the viability of the polymeric composition.

Still another object of the invention is to provide a composition which is less expensive as compared with conventional compositions used for similar purposes.

One more object of the invention is to extend the field of application of the composition as compared with conventional compositions used for the same purposes.

These and other objects of the present invention are attained by that in a polymeric composition comprising (polypropylene glycol)diurethanediepoxide, diglycidyl ether of bisphenol A, and a curing agent selected from the class of amines, according to the invention, the curing agent is a mixture of m-phenylenediamine and aniline taken in the weight ratio of 0.9 to 1:1, the components being taken in the following ratio, in parts by mass:

| | |
|---|---|
| (polypropylene glycol)diurethanediepoxide | 100 |
| diglycidyl ether of bisphenol A | 10 to 150 |
| mixture of m-phenylenediamine and aniline | 13 to 40 |

When the above composition is being cured, there takes place an interaction between (polypropylene glycol)diurethanediepoxide and diglycidyl ether of bisphenol A and aniline, and the cross-lining runs with m-phenylenediamine. As a result, there is formed a cross-linked macromolecule with terminal epoxide groups. The segment of the produced macromolecule increases, and the molecular mass changes from 5000 to 7500, which promotes the elasticity of the cured composition. The produced macromolecule comprises aromatic nuclei, isocyanate groups, ester groups, and hydroxyl groups, as well as aliphatic sections. It is known that the presence of aromatic nuclei, ester groups and hydroxyl groups in a macromolecule makes the cured composition highly adhesive to hydrophilic substrates, and the presence of aliphatic sections and isocyanate groups provides for its elasticity.

It is to be noted that the use of such curing agent as a mixture of aromatic amines of m-phenylenediamine and aniline provides for cold curing of the composition, though the same composition may cure at elevated temperatures as well. Thus, at a temperature of 80° C. the composition is cured for 4 hours, and at a temperature of 100°, for 2 hours. But the epoxy compositions, wherein aromatic amines, in particular m-phenyldiamine, are used as curing agents, can be cured only at elevated temperatures (80° and more).

The cold curing of the composition of the present invention is explained by that the decreased basicity of the aromatic amines as compared to that of aliphatic diamines intensifies the interaction between the electrone clouds of m-phenylenediamine and those of aniline, which causes a rupture of epoxy rings of the produced macromolecule at a normal temperature. This is also responsible for a higher viability of the composition, which allows the base material to be better wetted, thereby improving the corrosion resistance of the covering.

The utilization of the above curing agent considerably simplifies the process of preparing the polymeric composition. The curing agent, being a liquid aids substantially in the uniform distribution of the components in the above composition.

When used as varnish or glue for leather, rubber and other elastic materials and as an impregnating material for fabrics, the composition should preferably contain the components in the following ratio, in parts by mass:

| | |
|---|---|
| (polypropylene glycol)diurethanediepoxide | 100 |
| diglycidyl ether of bisphenol A | 10 to 50 |
| mixture of m-phenylenediamine and aniline | 13 to 21 |

It is advisable to add a mineral filler to the composition of the present invention in an amount of 1 to 30 parts by mass.

Due to the great degree of the cross-linking in the molecule produced, the sizes of the three-dimensional networks of this molecule are 7 to 8 times as high as those of the molecules of the conventional compositions used for similar purposes. This makes it possible to raise the degree of filling the composition of the invention with the mineral filler up to 300 parts by weight. The cost of the composition, in this case, is lower than that of the conventional epoxy compositions used for the same purposes by 30 to 40%.

Used as a mineral filler may be such substances as zink oxide, or titanium dioxide, or cadmium dioxide, or chromium oxide, or iron oxide, or manganese oxide, or manganese dioxide, or kaolin, or talc, or silica, or alumina, or lead oxide, or asbestos, or carbon black, or chalk, or graphite, or wood powder, or cement, or zink powder, or aluminium powder, and others, or mixtures thereof.

With the mineral filler added to the composition the latter is characterized by improved properties, in particular by higher mechanical strength, adhesive power, heat resistance, specific resistance, moisture resistance, and chemical stability.

It is advisable that a powder mineral filler in the form of a powder fraction be added to the composition of the present invention.

The polymeric composition containing zink oxide as a filler, with the ratio of the components being the following, in parts by mass:

| | |
|---|---|
| (polypropylene glycol)diurethanediepoxide | 100 |
| diglycidyl ether of bisphenol A | 50 |
| mixture of m-phenylenediamine and aniline | 23 |
| zinc oxide | 200 | possesses high adhesive power, mechanical strength, moisture resistance, chemical stability, heat resistance and elasticity. This permits the above composition to be used for the protection of metal structures in atmosphere, underground, and under water.

It is preferable that the composition be used for anticorrosion covering of unalloyed steels and cast irons.

To protect heat-engineering structures from corrosion, it is advisable that the composition of the present invention contain asbestos as a filler, the ratio of the components being the following, in parts by mass:

| | |
|---|---|
| (polypropylene glycol)diurethanediepoxide | 100 |
| diglycidyl ether of bisphenol A | 20 |
| mixture of m-phenylenediamine and aniline | 15 |
| asbestos | 35 |

The polymeric composition comprising, as a filler, a mixture of zink oxide, titanium dioxide, and silica taken in the weight ratio of 3:3:1 with the following ratio of the components, in parts by mass:

| | |
|---|---|
| (polypropylene glycol)diurethanediepoxide | 100 |
| diglycidyl ether of bisphenol A | 80 |
| mixture of m-phenylenediamine and aniline | 28 |
| mixture of zinc oxide, titanium dioxide, and silica | 120 | possesses high thixotropy, in addition to high physicochemical and mechanical properties. This allows the above composition to be used for protecting vertically extending metal structures from corrosion.

The polymeric composition comprising, as a filler, a mixture of talc and silica taken in the weight ratio of 9:1 with the following ratio of the components, in parts by mass:

| | |
|---|---|
| (polypropylene glycol)diurethanediepoxide | 100 |
| diglycidyl ether of bisphenol A | 150 |
| mixture of m-phenylenediamine and aniline | 40 |
| mixture of talc and silica | 150 | possesses increased moisture resistance, chemical stability, and specific resistance, in addition to high physico-chemical and mechanical properties. This allows the above composition to be used as an adhesive material and as a filling compound in electrical engineering and radio engineering.

When the composition of the present invention is intended to be used as an adhesive material and sealing material in hydraulic engineering and in construction, it is advisable that it contain portland cement as a filler, the ratio of the components being the following, in parts by mass:

| | |
|---|---|
| (polypropylene glycol)diurethanediepoxide | 100 |
| diglycidyl ether of bisphenol A | 40 |
| mixture of m-phenylenediamine and aniline | 19 |
| cement | 150 |

DETAILED DESCRIPTION OF THE INVENTION

The polymeric composition of the present invention is prepared by thoroughly stirring, in a conventional mixer for viscous liquids (polypropylene glycol)diurethanediepoxide having a molecular weight of 1000 to 2500 and diglycidyl ether of bisphenol A having a molecular weight of 300 to 700 for 30 to 40 min, subsequently adding a curing agent to the mixture, and again stirring it for 15 to 20 min.

The curing agent is prepared by thoroughly stirring m-phenylene-diamine and aniline taken in the weight ratio of 0.9 to 1:1 within a conventional mixer until m-phenylene-diamine completely dissolves in aniline.

It is possible, by changing mass or molar ratio of (polypropylene glycol)diurethanediepoxide and diglycidyl ether of bisphenol A, while adding a certain amount of said curing agent to the composition, to vary the physico-chemical and mechanical properties of this composition over a wide range.

To prepare the polymeric composition with properties dictated by the application of the composition, a mineral filler is added thereto. This mineral filler may be zinc oxide, or titanium dioxide, or cadmium oxide, or chromium oxide, or iron oxide, or manganese oxide, or manganese dioxide, or alumina, or lead oxide, or kaolin, or talc, or asbestos, or carbon black, or chalk, or graphite, or wood powder, or cement, or zink powder, or aluminium powder and others, or mixtures thereof.

The composition containing a filler is prepared in the following way.

A conventional mixer for viscous liquids is charged with (polypropylene glycol)diurethanediepoxide and a mineral filler. The latter is charged batchwise under stirring. Then diglycidyl ether of bisphenol A is added to said mixer. The mixture thus obtained is stirred until a uniform viscous mass is obtained, and a curing agent is added thereto, whereupon the mixture is again stirred for 15 to 20 min. The curing agent is prepared as described above.

The polymeric composition of the present invention in an uncured state is a cream-colored liquid having a viscosity of 150 to 450 P. The color of the composition may slightly vary depending on a filler applied. When in an uncured state the above composition can be diluted in ethyl alcohol, acetone, benzine, xylene, coal solvent, and other solvents.

The viability of the composition of the present invention is 48 hours.

The composition of the present invention has a number of advantages over prior art compositions. In particular, the anti-corrosion covering based on the composition of the invention is serviceable in a wide range of temperatures, namely from −50° to 150° C. The high viability of the composition makes it possible to prepare this composition in great amounts and to better wet the base material, which enhances the protection of the base material from corrosion. When exposed to impacts, bending and twisting, the covering does not break away from the base material and does not disintegrates.

The composition is applied to a metal base material in the following way.

The base material is first cleaned and degreased and then subjected to sand blasting.

The composition of the present invention can be applied to the base material manually with a brush or by spraying in vacuum, or by air jet.

When spraying in vacuum is taken advantage of, the composition may be heated up to a temperature of 50° C.

When the composition is applied by air jet, it should be preliminarily solved in a solvent which may be acetone, or xylene, or toluene, or coal solvent, or oil solvent, or ethyl alcohol, or methyl ethyl ketone, and others, or mixtures of these solvents. In this method of applying the composition to a base material, the number of layers applied should be not less than 3.

The composition of the present invention should not be applied to moist surface of metal structures intended for a long-time service.

The applied covering is subjected to physico-chemical and mechanical tests. The procedures of testing are given below.

BREAKING STRENGTH TEST

Samples of predetermined width and thickness are cut out from a free film. The samples are put into a breaking mashine. The force required for breaking the above sample is breaking strength.

The free film is prepared in the following way.

The composition without a solvent is applied to 200×200 mm sheet of fluorine plastic and held until it is completely dry, whereupon the cured film can be easily taken off the surface of the sheet of fluorine.

ADHESIVE POWER TEST

The composition of the invention is applied to 2 cylindrical samples made of base material. The samples which are 4.5 cm in diameter are stuck together. After the composition has been completely cured the samples are broken in a breaking machine of a maximum force of 1000 kg. The force at which the samples stuck together are separated is regarded as a value of adhesive power.

IMPACT STRENGTH TEST

The composition of the invention is applied to 0.8 mm-thick plate preliminary subjected to sand blasting. The thickness of the layer removed with sand blasting is 0.2 mm and more. After the applied composition has been completely cured, the plate is subjected to an impact with a load of 1 kg from a height of 50 cm. The load is a cylindrical billet provided with a ball underneath of 8 mm in diameter. Thus, the impact from various heights is imparted to the plate through the ball only.

CHEMICAL STABILITY TEST 0.5 to 1 mm-thick samples which are 50±1 mm in diameter are cut out from a free film and immersed into various agressive media for 24 hours. Then the samples are dried with filter paper and weighted in the course of the first minute after their extraction from an agressive medium. The change in weight of the sample in percents in comparison with the initial weight of the same sample is regarded as an index of chemical stability.

FLEXIBILITY TEST

The composition of the present invention is applied to a 0.1–0.15 mm-thick aluminum foil and held until it is completely cured. 10 mm-wide strips are cut out from the aluminum foil covered with the composition. The above strips are subjected to bending around pins of different diameters (20,15, 10, 5, 3 and 1 mm). If the covering applied to the aluminum foil cracks, for instance, on the pin having 3 mm in diameter, the value of flexibility of this material is considered to be 5 mm. It is quite clear that highly elastic materials do not crack on either of the pins.

MARTENS HEAT RESISTANCE TEST

The method consists in that a (200±2)×(15±0.2)×(10±0.2) mm bar made of the material to be tested is subjected to the action of a bending force of 50 kg/cm$^2$ while being progressively heated up. The temperature at which the sample being tested deforms by a definite value (by 6 mm according to the scale of the device) or fails in the result of bending is considered to be heat resistance of this material.

The composition of the present invention may be used as a glue for such materials as glass, wood, leather and various plastics. The above materials are stuck together in the following way.

The surfaces to be stuck together are thoroughly cleaned and treated with ethyl alcohol or acetone (leather is treated only with ethyl alcohol). After the solvent has dried, the composition is applied in a thin layer to the surfaces to be stuck together, whereupon said surfaces are pressed against each other with a force of 1 to 2 kg/cm$^2$ and held until the composition applied is cured.

Now the invention will be explained by way of specific examples thereof.

EXAMPLE 1

The polymeric composition of the present invention is prepared in the following way.

10 kg of (polypropylene glycol) diurethanediepoxide having a molecular weight of 2500 and a viscosity at a temperature of 50° C. being 250 P and 1 kg of diglycidyl ether of bisphenol A having a molecular weight of 400 and a viscosity of 10 P are charged into a mixer for viscous liquids and stirred therein for 30 min. Thereafter, a curing agent in an amount of 1.3 kg is charged into the mixer, and the content thereof is again stirred for 15 min.

For the purpose of the present invention, the curing agent is preliminarily prepared in the following way. m-Phenylenediamine in an amount of 0.63 kg and aniline in an amount of 0.67 kg are charged into a conventional mixer and stirred therein until m-phenylenediamine completely dissolves in aniline. The weight ratio of m-phenylenediamine and aniline is 0.9:1.

The composition of the present invention is applied to a base material from unalloyed steel by vacuum coating.

To determine the properties of the cured composition, the latter is subjected to physico-chemical and mechanical testing according to the techniques described above.

Given below are the results of the testing:

| | |
|---|---|
| breaking strength, in kg/cm$^2$ | 220 |
| adhesive power to steel, in kg/cm$^2$ | 60 |
| flexibility, in mm. | 1 |
| impact strength, in kg.cm. | 50 |
| absorbing capacity to moisture, in % by weight | 0.25 |
| resistance to a 30% H$_2$SO$_4$ solution, in % by weight | 2.6 |
| resistance to a 3% HCl solution, in % by weight | 0.35 |
| resistance to a 30% NaOH solution, in % by weight | 0.48 |
| swelling capacity in benzine, in % by weight | 0 |
| heat resistance, in °C. | 140 |
| specific volume resistance at a temperature of 20° C., in Ω . cm. | 1.4 . 10$^{15}$ |
| viability, in hours | 48 |
| freeze resistance, in °C. | −50 |

EXAMPLE 2

The polymeric composition of the present invention is prepared in the following way.

100 kg of (polypropylene glycol)diurethanediepoxide having a molecular weight of 2500 and a viscosity at a temperature of 50° C. being 250 P and 150 kg of diglycidyl ether of bisphenol A having a molecular weight of 400 and a viscosity of 10 P are charged into a mixer for viscous liquids and stirred therein for 30 min. Thereafter, a curing agent in an amount of 40 kg is charged into the mixer, and the content thereof is again stirred for 20 min.

For the purpose of the present invention, the curing agent is preliminary prepared as described in Example 1. The weight ratio of m-phenyldiamine and aniline is 1:1.

The prepared composition is applied to a base material and tested as described hereinabove.

Given below are the results of the testing:

| | |
|---|---|
| breaking strength, in kg/cm$^2$ | 530 |
| adhesive power to steel, in kg/cm$^2$ | 180 |
| flexibility, in mm. | 1 |
| impact strength, in kg.cm. | 50 |
| absorbing capacity to moisture, in % by weight | 0.09 |
| resistance to a 30% H$_2$SO$_4$ solution, in % by weight | 1.1 |
| resistance to a 3% HCl solution, in % by weight | 0.1 |
| resistance to a 30% NaOH solution, in % by weight | 0.12 |
| swelling capacity in benzine, in % by weight | 0 |
| specific volume resistance at a temperature of 20° C., in Ω . cm. | 1.5 . 10$^{16}$ |
| heat resistance, in °C. | 150 |
| viability, in hours | 48 |
| freeze resistance, in °C. | −50 |

EXAMPLE 3

The polymeric composition of the present invention is prepared in the following way.

10 kg of (polypropylene glycol) diurethanediepoxide having a molecular weight of 2500 and a viscosity of 250 P at a temperature of 50° C. and 5 kg of diglycidyl ether of bisphenol A having a molecular weight of 400 and a viscosity of 10 P are charged into a mixer for viscous liquids and stirred therein for 35 min. Thereafter, a curing agent in an amount of 2.1 kg is charged into the mixer, and the content thereof is again stirred for 15 min.

For the purpose of the present invention, the curing agent is preliminary prepared as described in Example 1. The weight ratio of m-phenyldiamine and aniline is 1:1.

The obtained composition is applied to a base material and tested as described hereinabove.

Given below are the results of the testing:

| | |
|---|---|
| breaking strength, in kg/cm$^2$ | 380 |
| adhesive power to steel, in kg/cm$^2$ | 130 |
| flexibility, in mm. | 1 |
| impact strength, in kg.cm. | 50 |
| absorbing capacity to moisture, in % by weight | 0.2 |
| resistance to a 30% H$_2$SO$_4$ solution, in % by weight | 2.1 |
| resistance to a 3% HCl solution, in % by weight | 0.3 |
| resistance to a 30% NaOH solution, in % by weight | 0.42 |
| swelling capacity in benzine, in % by weight | 0 |
| specific volume resistance at a temperature of 20° C., in Ω . cm. | 1.5 . 10$^{16}$ |
| heat resistance, in °C. | 150 |
| viability, in hours | 48 |
| freeze resistance, in °C. | −50 |

EXAMPLE 4

The polymeric composition of the present invention is prepared in the following way.

10 kg of (polypropylene glycol) diurethanediepoxide having a molecular weight of 2500 and a viscosity of 250 P at a temperature of 50° C. and 10 kg of diglycidyl ether of bisphenol A having a molecular weight of 400 and a viscosity of 10 P are charged into a mixer for viscous liquids and stirred therein for 40 min. Thereafter, a curing agent in an amount of 4 kg is charged into the same mixer, and the content thereof is again stirred for 20 min.

For the purpose of the present invention, the curing agent is preliminarily prepared as described in Example 1. The weight ratio of m-phenylenediamine and aniline is 1:1.

The prepared composition is applied to a base material and tested as described hereinabove.

Given below are the results of the testing:

| | |
|---|---|
| breaking strength, in kg/cm$^2$ | 500 |
| adhesive power to steel, in kg/cm$^2$ | 195 |
| flexibility, in mm. | 1 |
| impact strength, in kg.cm. | 50 |
| absorbing capacity to moisture, in % by weight | 0.12 |
| resistance to a 30% H$_2$SO$_4$ solution, in % by weight | 1.2 |
| resistance to a 3% HCl solution, in % by weight | 0.11 |
| resistance to a 30% NaOH solution, in % by weight | 0.12 |
| heat resistance, in °C. | 200 |
| swelling capacity in benzine, in % by weight | 0 |
| specific volume resistance at a temperature of 20° C., in Ω . cm. | 2.5 . 10$^{17}$ |
| viability, in hours | 48 |
| freeze resistance, in °C. | −50 |

EXAMPLE 5 (NEGATIVE)

The polymeric composition is prepared in the following way.

10 kg of (polypropylene glycol)diurethanediepoxide having a molecular weight of 2500 and a viscosity of 250 P at a temperature of 50° C. and 3 kg of diglycidyl ether of bisphenol A having a molecular weight of 400 and a viscosity of 10 P are charged into a mixer for viscous liquids and stirred therein for 30 min. Thereafter, a curing agent in an amount of 1,7 kg is charged into the same mixer, and the content thereof is again stirred for 20 min.

For the purpose of the present invention, the curing agent is prepared substantially as described in Example 1, but, as distinct from the present invention, the weight ratio of m-phenylenediamine and aniline is 0.7:1.

The prepared composition is applied to a base material and tested as described hereinabove.

Given below are the results of the testing:

| | |
|---|---|
| breaking strength, in kg/cm$^2$ | 140 |
| adhesive power to steel, in kg/cm$^2$ | 40 |
| flexibility, in mm. | 1 |
| impact strength, in kg.cm. | 30 |
| absorbing capacity to moisture, in % by weight | 0.35 |
| resistance to a 30% H$_2$SO$_4$ solution, in % by weight | 3.5 |
| resistance to a 3% HCl solution, in % by weight | 0.53 |
| resistance to 30% NaOH solution, in % by weight | 0.55 |
| swelling capacity in benzine, in % by weight | 0.12 |
| specific volume resistance at a temperature of 20° C., in Ω . cm. | 1.2 . 10$^{12}$ |
| heat resistance, in °C. | 120 |
| viability, in hours | 48 |
| freeze resistance, in °C. | −50 |

The above data show that the physico-chemical and mechanical properties of the composition turned out to be worse than those of the compositions of the previous Examples. Because m-phenylenediamine is deficient in the obtained composition, the latter fails to become completely cured and is an elastic-and-plastic covering which under minor impacts readily fails and thus the base material gets bare.

EXAMPLE 6 (NEGATIVE)

The polymeric composition is prepared substantially as described in Example 4, but, as distinct from the present invention, the weight ratio of m-phenylenediamine and aniline is 1:1.3.

Given below are the results of the testing:

| | |
|---|---|
| breaking strength, in kg/cm$^2$ | 150 |
| adhesive power to steel, in kg/cm$^2$ | 35 |
| flexibility, in mm. | 1 |
| impact strength, in kg.cm. | 30 |
| absorbing capacity to moisture, in % by weight | 0.36 |
| resistance to a 30% H$_2$SO$_4$ solution, in % by weight | 3.6 |
| resistance to a 3% HCl solution, in % by weight | 0.54 |
| resistance to a 30% NaOH, in % by weight | 0.54 |
| swelling capacity in benzine, in % by weight | 0.15 |
| specific volume resistance at a temperature of 20° C., in Ω . cm. | 1.3 . 10$^{12}$ |
| heat resistance, in °C. | 120 |
| viability, in hours | 48 |
| freeze resistance, in °C. | −50 |

The disadvantages of the obtained composition are similar to those described in Example 5.

EXAMPLE 7 (NEGATIVE)

The polymeric composition is prepared substantially as described in Example 4, but, as distinct from the present invention, the weight ratio of m-phenylenediamine and aniline is 1.2:1.

Given below are the results of the testing:

| | |
|---|---|
| breaking strength, in kg/cm$^2$ | 280 |
| adhesive power to steel, in kg/cm$^2$ | 100 |
| flexibility, in mm. | 15 |
| impact strength, in kg.cm. | 15 |
| absorbing capacity to moisture, in % by weight | 0.15 |
| resistance to a 30% H$_2$SO$_4$ solution, in % by weight | 1.9 |
| resistance to a 3% HCl solution, in % by weight | 0.3 |
| resistance to a 30% NaOH solution, in % by weight | 0.42 |
| swelling capacity in benzine, in % by weight | 0 |
| specific volume resistance at a temperature of 20°, in Ω . cm. | 1.4 . 10$^{15}$ |
| heat resistance, in °C. | 110 |
| viability, in hours | 48 |
| freeze resistance, in °C. | −50 |

With the introduction of the excess of m-phenylenediamine in the composition the latter acquires higher strength and higher resistance to various reagents, but at the same time it suffers from higher brittleness and lower adhesive power.

EXAMPLE 8 (NEGATIVE)

The polymeric composition is prepared substantially as described in Example 1, but, as distinct from the present invention, the amount of diglycidyl ether of bisphenol A is 5 parts by mass (0.5 kg of diglycidyl ether of biphenol A is charged into a mixer).

Given below are the following results of the testing:

| | |
|---|---|
| breaking strength, in kg/cm$^2$ | 180 |
| adhesive power to steel, in kg/cm$^2$ | 20 |
| flexibility, in mm. | 1 |
| impact strength, in kg.cm. | 50 |
| absorbing capacity to moisture, in % by weight | 0.4 |
| resistance to a 30% H$_2$SO$_4$ solution, in % by weight | 2.95 |
| resistance to a 3% HCl solution, in % by weight | 0.37 |
| resistance to a 30% NaOH solution, in % by weight | 0.51 |
| swelling capacity in benzine, in % by weight | 4 |
| specific volume resistance at a temperature of 20° C., in Ω . cm. | 1.5 . 10$^{15}$ |
| heat resistance, in °C. | 140 |
| viability, in hours | 48 |
| freeze resistance, in °C. | −50 |

The above data show that because of deficiency of diglycidyl ether of bisphenol A in the obtained composition the latter is characterized by an increased elasticity. At the same time, the resistance of the composition to agressive media is much lower. In addition, the low adhesive power of the composition makes it not useful for protecting metals from corrosion.

EXAMPLE 9 (NEGATIVE)

The polymeric composition is prepared substantially as described in Example 4, but, as distinct from the present invention, the amount of diglycidyl ether of bisphenol A is 155 parts by mass (15 kg of diglycidyl ether of bisphenol A is charged into the mixer).

Given below are the following results of the testing:

| | |
|---|---|
| breaking strength, in kg/cm$^2$ | 650 |
| adhesive power to steel, in kg/cm$^2$ | 255 |
| flexibility, in mm. | 30 |
| impact strength, in kg.cm. | 35 |
| absorbing capacity to moisture, in % by weight | 0.1 |
| resistance to a 30% H$_2$SO$_4$ solution, in % by weight | 0.8 |
| resistance to a 3% HCl solution, in % by weight | 0.6 |
| resistance to a 30% NaOH solution, in % by weight | 0 |
| swelling capacity in benzine, in % by weight | 0 |
| specific volume resistance at a temperature of 20° C., in Ω . cm. | 15 . 10$^{17}$ |
| heat resistance, in °C. | 210 |
| viability, in hours | 48 |
| freeze resistance, in °C. | 50 |

The above data show that the obtained composition possesses high strength, adhesive power and other positive properties. On the other hand, however, this same composition suffers from increased brittleness inherent in prior art epoxy compositions.

EXAMPLE 10 (NEGATIVE)

The polymeric composition is prepared in the following way.

10 kg of (polypropylene glycol)diurethanediepoxide having a molecular weight of 1500 and a viscosity of 50 P at a temperature of 50° C. and 2.8 kg of diglycidyl ether of bisphenol A having a molecular weight of 400 and viscosity of 10 P are charged into a mixer for viscous liquids and stirred therein for 30 min, whereupon a curing agent is charged into the mixer. As distinct from the present invention, the curing agent is taken in an amount of 1 kg which is 1 part by mass. Thereafter, the content of the mixer is again thoroughly stirred for 15 min.

The curing agent is prepared as described in Example 1.

The prepared composition is applied to a base material and tested as described hereinabove.

Given below are the results of the testing:

| | |
|---|---|
| breaking strength, in kg/cm$^2$ | 50 |
| adhesive power to steel, in kg/cm$^2$ | 10 |
| flexibility, in mm. | 1 |
| impact strength, kg.cm. | 15 |
| absorbing capacity to moisture, in % by weight | 2.9 |
| resistance to a 30% H$_2$SO$_4$ solution, in % by weight | decomposes |
| resistance to a 3% HCl solution, in % by weight | decomposes |
| resistance to a 30% NaOH solution, in % by weight | decomposes |
| swelling capacity in benzine, in % by weight | 5.3 |

The above data show that the prepared composition possesses an extremely low chemical stability and moisture resistance, increased brittleness and low adhesive power. Such characteristics make this composition unsuitable for usage as an anti-corrosion covering.

EXAMPLE 11

The polymeric composition of the present invention is prepared in the following way.

10 kg of (polypropylene glycol)diurethanediepoxide having a molecular weight of 1500 and viscosity of 90 P at a temperature of 50° C. and 20 kg of powdered zinc oxide with a particle size of 10 to 250 μm are charged into a mixer for viscous liquids. The powdered zinc oxide is charged by small amounts under continuous stirring of the content of the mixer. Then 5 kg of diglycidyl ether of bisphenol A having a molecular weight of 500 and viscosity of 15 P are charged into said mixer, and the obtained mixture is stirred until a homogeneous viscous mass is obtained. Thereafter, a curing agent in an amount of 20 kg is charged into the same mixer, and the content thereof is again stirred for 20 min.

The curing agent is prepared substantially as described in Example 1, the weight ratio of m-phenylenediamine and aniline being 1:1.

The prepared composition is applied to a base material and tested as described hereinabove.

Given below are the results of the testing:

| | |
|---|---|
| breaking strength, in kg/cm$^2$ | 350 |
| adhesive power to steel, in kg/cm$^2$ | 120 |
| flexibility, in mm. | 1 |
| impact strength, in kg.cm. | 50 |
| absorbing capacity to moisture, in % by weight | 0.14 |
| resistance to a 30% H$_2$SO$_4$ solution, in % by weight | 1.92 |
| resistance to a 3% HCl solution, in % by weight | 0 |
| resistance to a 30% NaOH, in % by weight | 0.38 |
| swelling capacity in benzine, in % by weight | 0.16 |
| specific volume resistance at a temperature of 20° C., in Ω . cm. | 1.1 . 10$^{16}$ |
| heat resistance, in °C. | 190 |
| viability, in hours | 48 |
| freeze resistance, in °C. | 50 |

EXAMPLE 12

The composition of the present invention is prepared in the following way.

10 kg of (polypropylene glycol)diurethanediepoxide having a molecular weight of 1000 and viscosity of 60 P at a temperature of 50° C. and 3.5 kg of asbestos (powder having a particle size of 10 to 250 μm) are charged into a mixer for viscous liquids. The asbestos is charged by small amounts under continuous stirring of the content of the mixer. Next, 2 kg of diglycidyl ether of bisphenol A having a molecular weight of 700 and viscosity of 60 P are charged into said mixer, and the obtained mixture is stirred until a homogeneous viscous mass is obtained. Thereafter, a curing agent in an amount of 1.5 kg is charged into the same mixer, and the content of the latter is again stirred for 15 min.

The curing agent is prepared substantially as described in Example 1, the weight ratio of m-phenylenediamine and aniline being 0.9:1.

The prepared composition is applied to a base material and tested as described hereinabove.

Given below are the results of the testing:

| | |
|---|---|
| breaking strength, in kg/cm$^2$ | 230 |
| adhesive power to aluminium, in kg/cm$^2$ | 22 |
| flexibility, in mm. | 3 |
| impact strength, in kg.cm. | 50 |
| absorbing capacity to moisture, in % by weight | 0.35 |
| resistance to a 30% H$_2$SO$_4$ solution, in % by weight | 2.5 |
| resistance to a 3% HCl solution, in % by weight | 0.38 |
| resistance to a 30% NaOH solution, in % by weight | 0.62 |
| swelling capacity in benzine, in % by weight | 1.4 |
| specific volume resistance at a temperature of 20° C., in Ω . cm. | 1.3 . 10$^{16}$ |
| heat resistance, in °C. | 200 |
| viability, in hours | 48 |
| freeze resistance, in °C. | −50 |

EXAMPLE 13

The polymeric composition of the present invention is prepared in the following way.

10 kg of (polypropylene glycol)diurethanediepoxide having a molecular weight of 2500 and viscosity of 250 P at a temperature of 50° C. and 12 kg of a mixture consisting of zinc oxide, titanium oxide, and silica, taken in the weight ratio of 3:3:1 (a particle size of the mixture is from 10 to 250 μm) are charged into a mixer for viscous liquids. The mixture is charged by small amounts under continuous stirring of the content of the mixer. Next, 8 kg of diglycidyl ether of bisphenol A having a molecular weight of 500 and viscosity of 15 P are charged into the same mixer, and the obtained mixture is stirred until a homogeneous viscous mass is obtained. Thereafter, a curing agent in an amount of 2.8 kg is charged into the mixer, and the content thereof is again stirred for 20 min.

The curing agent is prepared substantially as described in Example 1, the weight ratio of m-phenylenediamine and aniline being 1:1.

The prepared composition is applied to a base material and tested as described hereinabove.

Given below are the results of the testing:

| | |
|---|---|
| breaking strength, in kg/cm$^2$ | 400 |
| adhesive power to steel, in kg/cm$^2$ | 120 |
| flexibility, in mm. | 1 |
| impact strength, in kg.cm. | 50 |
| absorbing capacity to moisture, in % by weight | 0.11 |
| resistance to a 30% H$_2$SO$_4$ solution, in % by weight | 1.25 |
| resistance to a 3% HCl solution, in % by weight | 0.16 |
| resistance to a 30% NaOH solution, in % by weight | 0.14 |
| swelling capacity in benzine, in % by weight | 0 |
| specific volume resistance at a temperature of 20° C., in Ω . cm. | 1.3 . 10$^{16}$ |
| heat resistance, in °C. | 210 |
| viability, in hours | 48 |
| freeze resistance, in °C. | −50 |

EXAMPLE 14

The polymeric composition of the present invention is prepared in the following way.

10 kg of (polypropylene glycol)diurethanediepoxide having a molecular weight of 2500 and viscosity of 250 P at a temperature of 50° C. and 15 kg of a mixture consisting of talc and silica, taken in the weight ratio of 0.8:0.2 and having a particle size of 10 to 250 μm are charged into a mixer for viscous liquids. The mixture is charged in small amounts under continuous stirring of the content of the mixer. Next, 15 kg of diglycidyl ether of bisphenol A having a molecular weight of 400 and viscosity of 10 P are charged into the same mixer, and the obtained mixture is stirred until a homogeneous viscous mass is obtained. Thereafter, a curing agent in an amount of 4 kg is charged into the mixer, and the content thereof is again stirred for 20 min.

The curing agent is prepared substantially as described in Example 1, the weight ratio of m-phenylenediamine and aniline being 1:1.

The prepared composition is applied to a steel base material and tested as described hereinabove.

Given below are the results of the testing:

| | |
|---|---|
| breaking strength, in kg/cm$^2$ | 550 |
| adhesive power to steel, in kg/cm$^2$ | 200 |
| flexibility, in mm. | 1 |
| impact strength, in kg.cm. | 50 |
| absorbing capacity to moisture, in % by weight | 0.05 |
| resistance to a 30% H$_2$SO$_4$ solution, in % by weight | 0.8 |
| resistance to a 3% HCl solution, in % by weight | 0.1 |
| resistance to a 30% NaOH solution, in % by weight | 0.1 |
| swelling capacity in benzine, in % by weight | 0 |
| specific volume resistance at a temperature of 20° C., in Ω . cm. | 1.1 . 10$^{17}$ |
| heat resistance, in °C. | 210 |
| viability, in hours | 48 |

EXAMPLE 15

The polymeric composition of the present invention is prepared in the following way.

10 kg of (polypropylene glycol)diurethanediepoxide having a molecular weight of 2500 and viscosity of 250 P at a temperature of 50° C. and 15 kg of powdered portland cement with a particle size of 10 to 250 μm are charged into a mixer for viscous liquids. The portland cement is charged in small amounts under continuous stirring of the content of the mixer. Next, 4 kg of diglycidyl ether of bisphenol A having a molecular weight of 500 and viscosity of 15 P are charged into the same mixer, and the obtained mixture is stirred until a homogeneous viscous mass is obtained. Thereafter, a curing agent in an amount of 1.9 kg is charged into the mixer, and the content thereof is again stirred for 15 min.

The curing agent is prepared substantially as described in Example 1, the weight ratio of m-phenylenediamine and aniline being 1:1.

The prepared composition is applied to a base material and tested as described hereinabove.

Given below are the results of the testing:

| | |
|---|---|
| breaking strength, in kg/cm$^2$ | 300 |
| adhesive power to steel, in kg/cm$^2$ | 90 |
| flexibility, in mm. | 3 |
| impact strength, in kg.cm. | 50 |
| absorbing capacity to moisture, in % by weight | 0.18 |
| resistance to a 30% H$_2$SO$_4$ solution, in % by weight | 1.2 |
| resistance to a 3% HCl solution, in % by weight | 0.12 |
| resistance to a 30% NaOH solution, in % by weight | 0.3 |
| swelling capacity in benzine, in % by weight | 0 |
| specific volume resistance at a temperature of 20° C., in Ω . cm. | 1.4 . 10$^{16}$ |
| heat resistance, in °C. | 200 |
| viability, in hours | 48 |
| freeze resistance, in °C. | −50 |

EXAMPLE 16

The polymeric composition is prepared substantially as described in Example 1. The molecular weight and viscosity of (polypropylene glycol)diurethanediepoxide are, respectively, 2500 and 250 P, and those of diglycidyl ether of bisphenol A, 400 and 10 P. Zink oxide is charged in amount of 0.1 kg.

Given below are the results of the testing:

| | |
|---|---|
| breaking strength, in kg/cm$^2$ | 380 |
| adhesive power to steel, in kg/cm$^2$ | 130 |
| flexibility, in mm. | 1 |
| impact strength, in kg.cm. | 50 |
| absorbing capacity to moisture, in % by weight | 0.2 |
| resistance to a 30% H$_2$SO$_4$ solution, in % by weight | 2.6 |
| resistance to a 3% HCl solution, in % by weight | 0.35 |
| resistance to a 30% NaOH solution, in % by weight | 0.6 |
| swelling capacity in benzine, in % by weight | 0.9 |
| specific volume resistance at a temperature of 20° C., in Ω . cm. | 2.1 . 10$^{15}$ |
| heat resistance, in °C. | 160 |
| viability, in hours | 48 |
| freeze resistance, in °C. | −50 |

EXAMPLE 17

The polymeric composition of the present invention is prepared in the following way.

10 kg of (polypropylene glycol)diurethanediepoxide having a molecular weight of 2500 and viscosity of 250 P at a temperature of 50° C. and 30 kg of powdered zink oxide with a particle size of 10 to 250 μm are charged into a mixer for viscous liquids. The powdered zink oxide is charged in small amounts under continuous stirring of the content of the mixer. Next, 15 kg of diglycidyl ether of bisphenol A having a molecular weight of 400 and viscosity of 10 P are charged into the same mixer, and the obtained mixture is stirred until a homogeneous viscous mass is obtained. Thereafter, a curing agent in an amount of 4 kg is charged into the mixer, and the content thereof is again stirred for 20 min.

The curing agent is prepared substantially as described in Example 1, the weight ratio of m-phenylenediamine and aniline being 1:1.

The prepared composition is applied to a base material from aluminum and tested as described hereinabove.

Given below are the results of the testing:

| | |
|---|---|
| breaking strength, in kg/cm$^2$ | 600 |
| adhesive power to aluminium, in kg/cm$^2$ | 110 |
| flexibility, in mm. | 3 |
| impact strength, in kg.cm. | 50 |
| absorbing capacity to moisture, in % by weight | 0.11 |
| resistance to a 30% H$_2$SO$_4$ solution, in % by weight | 1.2 |
| resistance to a 3% HCl solution, in % by weight | 0.1 |
| resistance to a 30% NaOH solution, in % by weight | 1.2 |
| swelling capacity in benzine, in % by weight | 0 |
| specific volume resistance at a temperature of 20° C., in Ω . cm. | 1.1 . 10$^{16}$ |
| heat resistance, in °C. | 210 |
| viability, in hours | 48 |
| freeze resistance, in °C. | −50 |

EXAMPLE 18 (NEGATIVE)

The polymeric composition is prepared substantially as described in Example 11, but, as distinct from the present invention, the curing agent is taken in an amount of 42 parts by mass (4.2 kg of the curing agent are charged into the mixer).

Given below are the results of the testing:

| | |
|---|---|
| breaking strength, in kg/cm$^2$ | 110 |
| adhesive power to steel, in kg/cm$^2$ | 22 |
| flexibility, in mm. | 15 |
| impact strength, in kg.cm. | 25 |
| absorbing capacity to moisture, in % by weight | 1.5 |
| resistance to a 30% H$_2$SO$_4$ solution, in % by weight | 15.8 |
| resistance to a 3% HCl solution, in % by weight | 4.3 |
| resistance to 30% NaOH solution, in % by weight | 6.7 |
| swelling capacity in benzine, in % by weight | 2.1 |
| specific volume resistance at a temperature of 20° C., in Ω . cm. | 1.1 . 10$^{10}$ |
| heat resistance, in °C. | 75 |
| viability, in hours | 48 |
| freeze resistance, in °C. | −25 |

The above data show that the prepared composition is characterized by increased brittleness, low adhesive power, and very low moisture resistance and chemical stability. In view of the above, it is not expedient to use this composition an anti-corrosion covering.

EXAMPLE 19

The polymeric composition of the invention is prepared in the following way.

10 kg of (polypropylene glycol)diurethanediepoxide having a molecular weight of 1500 and viscosity of 90 P at a temperature of 50° and 3 kg of powdered aluminium oxide with a particle size of 10 to 250 μm are charged into a mixer for viscous liquids. The powdered aluminium oxide is charged in small amounts under continuous stirring of the content of the mixer. Next, 3 kg of diglycidyl ether of bisphenol A having a molecular weight of 400 and viscosity of 10 P are charged into the same mixer, and the obtained mixture is stirred until a homogeneous viscous mass is obtained. Thereafter, a curing agent in an amount of 1.7 kg is charged into the mixer, and the content thereof is again stirred for 20 min.

The curing agent is prepared substantially as described in Example 1, the weight ratio of m-phenylenediamine and aniline being 1:1.

The prepared composition is applied to a base material from aluminium and tested as described hereinabove.

Given below are the results of the testing:

| | |
|---|---|
| breaking strength, in kg/cm$^2$ | 325 |
| adhesive power to aluminium, in kg/cm$^2$ | 60 |
| flexibility, in mm. | 3 |
| impact strength, in kg.cm. | 50 |
| absorbing capacity to moisture, in % by weight | 0.15 |
| resistance to a 30% H$_2$SO$_4$ solution, in % by weight | 1.95 |
| resistance to a 3% HCl solution, in % by weight | 0.18 |
| resistance to a 30% NaOH solution, in % by weight | 0.41 |
| swelling capacity in benzine, in % by weight | 0 |
| specific volume resistance at a temperature of 20° C., in Ω . cm. | 0.8 . 10$^{16}$ |
| heat resistance, in °C. | 185 |
| viability, in hours | 48 |
| freeze resistance, in °C. | −50 |

EXAMPLE 20

The polymeric composition of the present invention is prepared in the following way.

10 kg of (polypropylene glycol)diurethanediepoxide having a molecular weight of 2500 and viscosity of 250 P at a temperature of 50° C. and 12 kg of powdered lead oxide with a particle size of 10 to 250 μm are charged into a mixer for viscous liquids. The powdered lead oxide is charged in small amounts under continuous stirring of the content of the mixer. Next, 5 kg of diglycidyl ether of bisphenol A having a molecular weight of 500 and viscosity of 15 P are charged into the same mixer, and the obtained mixture is stirred until a homogeneous viscous mass is obtained. Thereafter, a curing agent in an amount of 2.3 kg is charged into the mixer, and the content thereof is again stirred for 20 min.

The curing agent is prepared substantially as described in Example 1, the weight ratio of m-phenylenediamine and aniline being 0.9:1.

The prepared composition is applied to a base material from steel and tested as described hereinabove.

Given below are the results of the testing:

| | |
|---|---|
| breaking strength, in kg/cm$^2$ | 340 |
| adhesive power to steel, in kg/cm$^2$ | 110 |
| flexibility, in mm. | 3 |
| impact strength, in kg.cm. | 50 |
| absorbing capacity to moisture, in % by weight | 0.12 |
| resistance to a 30% H$_2$SO$_4$ solution, in % by weight | 1.5 |
| resistance to a 3% HCl solution, in % by weight | 0.12 |
| resistance to a 30% NaOH solution, in % by weight | 0.27 |
| swelling capacity in benzine, in % by weight | 0 |
| specific volume resistance at a temperature of 20° C., in Ω . cm. | 1.5 . 10$^{16}$ |
| heat resistance, in °C. | 190 |
| viability, in hours | 48 |
| freeze resistance, in °C. | −50 |

EXAMPLE 21

The polymeric composition of the present invention is prepared in the following way.

50 kg of (polypropylene glycol)diurethanediepoxide having a molecular weight of 1500 and viscosity of 90 P at a temperature of 50° C. and 10 kg of powdered silica with a particle size of 10 to 250 μm are charged into a mixer for viscous liquids.

The powdered silica is charged in small amounts under continuous stirring of the content of the mixer. Next, 5 kg of diglicidyl ether of bisphenol A having a molecular weight of 600 and viscosity of 25 P are charged into the same mixer, and the obtained mixture is stirred until a homogeneous viscous mass is obtained. Thereafter, a curing agent in an amount of 6.5 kg is charged into the mixer, and the content thereof is again stirred for 15 min.

The curing agent is prepared substantially as described in Example 1, the weight ratio of m-phenylenediamine and aniline being 1:1.

The prepared composition is applied to a base material from aluminium and tested as described hereinabove.

Given below are the results of the testing:

| | |
|---|---|
| breaking strength, in kg/cm$^2$ | 250 |
| adhesive power to aluminium, in kg/cm$^2$ | 35 |
| flexibility, in mm | 1 |
| impact strength, in kg . cm | 50 |
| absorbing capacity to moisture, in % by weight | 0.35 |
| resistance to a 30% H$_2$SO$_4$ solution, in % by weight | 2.5 |
| resistance to a 3% HCl solution, in % by weight | 0.55 |
| resistance to a 30% NaOH solution, in % by weight | 0.51 |
| swelling capacity in benzine, in % by weight | 0 |
| specific volume resistance at a temperature of 20° C., in Ω . cm | 1.2 . 10$^{15}$ |
| heat resistance, in °C. | 185 |
| viability, in hours | 48 |
| freeze resistance, in °C. | −50 |

EXAMPLE 22

Polymeric composition of the present invention is prepared in the following way.

10 kg of (polypropylene glycol)diurethanediepoxide having a molecular weight of 1000 and viscosity of 60 P at a temperature of 50° C. and 10 kg of powdered cadmium oxide with a particle size of 10 to 250 μm are charged into a mixer for viscous liquids. The powdered cadmium oxide is charged in small amounts under continuous stirring of the content of the mixer. Next, 5 kg of diglycidyl ether of bisphenol A having a molecular weight of 700 and viscosity of 60 P are charged into the same mixer, and the obtained mixture is stirred until a homogeneous viscous mass is obtained. Thereafter, a curing agent in an amount of 2.3 kg is charged into the mixer, and the content thereof is again stirred for 15 min.

The curing agent is prepared substantially as described in Example 1, the weight ratio of m-phenylenediamine and aniline being 1:1.

The prepared composition is applied to a base material from steel and tested as described hereinabove.

Given below are the results of the testing:

| | |
|---|---|
| breaking strength, in kg/cm$^2$ | 350 |
| adhesive power to steel, in kg/cm$^2$ | 125 |
| flexibility, in mm. | 1 |
| impact strength, kg.cm. | 50 |
| absorbing capacity to moisture, in % by weight | 0.15 |
| resistance to a 30% H$_2$SO$_4$ solution, in % by weight | 1.95 |
| resistance to a 3% HCl solution, in % by weight | 0.17 |
| resistance to 30% NaOH solution, in % by weight | 0.35 |
| swelling capacity in benzine, in % by weight | 0 |
| specific volume resistance at a temperature of 20° C., in Ω . cm. | 1.3 . 10$^{16}$ |
| heat resistance, in °C. | 190 |
| viability, in hours | 48 |
| freeze resistance, in °C. | −50 |

EXAMPLE 23

The polymeric composition of the present invention is prepared in the following way.

100 kg of (polypropylene glycol)diurethanediepoxide having a molecular weight of 2500 and viscosity of 250 P at a temperature of 50° C. and 100 kg of powdered chromium oxide with a particle size of 10 to 250 μm are charged into a mixer for viscous liquids. The powdered chromium oxide is charged in small amounts under continuous stirring of the content of the mixer. Next, 25 kg of diglycidyl ether of bisphenol A having a molecular weight of 600 and viscosity of 15 P are charged into the same mixer, and the obtained mixture is stirred until a homogeneous viscous mass is obtained. Thereafter, a curing agent in an amount of 15 kg is charged into the mixer, and the content thereof is again stirred for 20 min.

The curing agent is prepared substantially as described in Example 1, the weight ratio of m-phenylenediamine and aniline being 1:1.

The prepared composition is applied to a base material from steel and tested as described hereinabove.

Given below are the results of the testing:

| | |
|---|---|
| breaking strength, in kg/cm$^2$ | 230 |
| adhesive power to steel, in kg/cm$^2$ | 60 |
| flexibility, in mm. | 1 |
| impact strength, kg.cm. | 50 |
| absorbing capacity to water, in % by weight | 0.15 |
| resistance to a 30% H$_2$SO$_4$ solution, in % by weight | 1.5 |
| resistance to a 3% HCl solution, in % by weight | 0.16 |
| resistance to a 30% NaOH solution, in % by weight | 0.28 |
| swelling capacity in benzine, in % by weight | 0 |
| specific volume resistance at a temperature of 20° C., in Ω . cm. | 1.2 . 10$^{15}$ |
| heat resistance, in °C. | 175 |
| viability, in hours | 48 |
| freeze resistance, in °C. | −50 |

EXAMPLE 24

The polymeric composition of the present invention is prepared in the following way.

20 kg of (polypropylene glycol)diurethanediepoxide having a molecular weight of 2500 and viscosity of 250 P at a temperature of 50° C. and 24 kg of powdered titanium dioxide with a particle size of 10 to 250 μm are charged into a mixer for viscous liquids. The powdered titanium dioxide is charged in small amounts under continuous stirring of the content of the mixer. Next, 8 kg of diglycidyl ether of bisphenol A having a molecular weight of 700 and viscosity of 60 P are charged into the same mixer, and the obtained mixture is stirred until a homogeneous viscous mass is obtained. Thereafter, a curing agent in an amount of 24 kg is charged into the mixer, and the content thereof is again stirred for 20 min.

The curing agent is prepared substantially as described in Example 1, the weight ratio of m-phenylenediamine and aniline being 1:1.

The prepared composition is applied to a base material from aluminium and tested as described hereinabove.

Given below are the results of the testing:

| | |
|---|---|
| breaking strength, in kg/cm$^2$ | 300 |
| adhesive power to aluminium, in kg/cm$^2$ | 45 |
| flexibility, in mm | 3 |
| impact strength, in kg.cm. | 50 |
| absorbing capacity, in % by weight | 0.12 |
| resistance to a 30% H$_2$SO$_4$ solution, in % by weight | 1.65 |
| resistance to a 3% HCl solution, in % by weight | 0.12 |
| resistance to a 30% NaOH solution, in % by weight | 0.3 |
| swelling capacity in benzine, in % by weight | 0 |
| specific volume resistance at a temperature of 20° C., in Ω . cm | 1.3 . 10$^{16}$ |
| heat resistance, in ° C. | 190 |
| viability, in hours | 48 |
| freeze resistance, in °C. | −40 |

EXAMPLE 25

The polymeric composition of the present invention is prepared in the following way.

10 kg of (polypropylene glycol)diurethanediepoxide having a molecular weight of 2500 and viscosity of 250 P at a temperature of 50° C. and 10 kg of powdered manganese dioxide with a particle size of 10 to 250 μm are charged into a mixer for viscous liquids. The powdered manganese dioxide is charged in small amounts under continuous stirring of the content of the mixer. Next, 5 kg of diglycidyl ether of bisphenol A having a molecular weight of 400 and viscosity of 10 P are charged into the same mixer, and the obtained mixture is stirred until a homogeneous viscous mass is obtained. Thereafter, a curing agent in an amount of 2.3 kg is charged into the mixer, and the content thereof is again stirred for 15 min.

The curing agent is prepared substantially as described in Example 1, the weight ratio of m-phenylenediamine and aniline being 1:1.

The prepared composition is applied to a base material from steel and tested as described hereinabove.

Given below are the results of the testing:

| | |
|---|---|
| breaking strength, in kg/cm$^2$ | 325 |
| adhesive power to steel, in kg/cm$^2$ | 105 |
| flexibility, in mm | 3 |
| impact strength, in kg.cm. | 50 |
| absorbing capacity to water, in % by weight | 0.15 |
| resistance to a 30% H$_2$SO$_4$ solution, in % by weight | 1.95 |
| resistance to a 3% HCl solution, in % by weight | 0.18 |
| resistance to a 30% NaOH solution, in % by weight | 0.41 |
| swelling capacity in benzine, in % by weight | 0 |
| specific volume resistance at a temperature of 20° C., in Ω . cm | 0.8 . 10$^{16}$ |
| heat resistance, in hours | 48 |
| freeze resistance, in °C. | −50 |

EXAMPLE 26

The polymeric composition of the present invention is prepared in the following way.

20 kg of (polypropylene glycol)diurethanediepoxide having a molecular weight of 1500 and viscosity of 80 P at a temperature of 50° C. and powdered iron oxide with a particle size of 10 to 250 μm are charged into a mixer for viscous liquids. The powdered iron oxide is charged in small amounts under continuous stirring of the content of the mixer. Next, 6 kg of diglycidyl ether of bisphenol A having a molecular weight of 600 and viscosity of 25 P are charged into the same mixer, and the obtained mixture is stirred until a homogeneous viscous mass is obtained. Thereafter, a curing agent in an amount of 3.4 kg is charged into the mixer, and the content thereof is again stirred for 15 min.

The curing agent is prepared substantially as described in Example 1, the weight ratio of m-phenylenediamine and aniline being 1:1.

The prepared composition is applied to a base material from steel and tested as described hereinabove.

Given below are the results of the testing:

| | |
|---|---|
| breaking strength, in kg/cm$^2$ | 285 |
| adhesive power to steel, in kg/cm$^2$ | 70 |
| flexibility, in mm | 1 |
| impact strength, in kg.cm. | 50 |
| absorbing capacity to water, in % by weight | 0.4 |
| resistance to 30% H$_2$SO$_4$ solution, in % by weight | 2.7 |
| resistance to 3% HCl solution, in % by weight | 0.38 |
| resistance to 30% NaOH solution, in % by weight | 0.41 |
| swelling capacity in benzine, in % by weight | 0 |
| specific volume resistance at a temperature of 20° C., in Ω . cm | 1.1 . 10$^{14}$ |
| heat resistance, in ° C. | 180 |
| viability, in hours | 48 |
| freze resistance, in °C. | −50 |

While particular embodiments of the invention have been described, various modifications thereof will be apparent to those skilled in the art and therefore it is not intended that the invention be limited to the disclosed embodiments or to the details thereof and the departures may be made therefrom within the spirit and scope of the invention as defined in the claims.

We claim:

1. A polymeric composition comprising the following components, in parts by mass:

| | |
|---|---|
| (polypropylene glycol)diurethanediepoxide | 100 |
| diglycidyl ether of bisphenol A | 10 to 150 |
| curing agent which is a mixture of m-phenylenediamine and aniline taken in the weight ratio of 0.9–1 to 1 | 13 to 40 |

2. A polymeric composition as claimed in claim 1, wherein the components are taken in the following ratio, in parts by mass:

| | |
|---|---|
| (polypropylene glycol)diurethanediepoxide | 100 |
| diglycidyl ether of bisphenol A | 10 to 50 |
| mixture of m-phenylenediamine and aniline | 13 to 21 |

3. A polymeric composition as claimed in claim 1, which additionally comprises a mineral filler in an amount of 1 to 300 parts by mass.

4. A polymeric composition as claimed in claim 3, wherein the mineral filler is contained in the form of a powdered fraction.

5. A polymeric composition as claimed in claim 4, wherein the components are taken in the following ratio, in parts by mass:

| | |
|---|---|
| (polypropylene glycol)diurethanediepoxide | 100 |
| diglycidyl ether of bisphenol A | 50 |
| mixture of m-phenylenediamine and aniline | 23 |
| filler which is zink oxide | 2200 |

6. A polymeric composition as claimed in claim 4, wherein the components are taken in the following ratio, in parts by mass:

| | |
|---|---|
| (polypropylene glycol)diurethanediepoxide | 100 |
| diglycidyl ether of bisphenol A | 20 |
| mixture of m-phenylenediamine and aniline | 15 |
| filler which is asbestos | 35 |

7. A polymeric composition as claimed in claim 4, wherein the components are taken in the following ratio, in parts by mass:

| | |
|---|---|
| (polyropylene glycol) diurethanediepoxide | 100 |
| diglycidyl ether of bisphenol A | 80 |
| mixture of m-phenylenediamine and aniline | 28 |
| filler which is a mixture of zink oxide, titanium oxide, and silica taken in the weight ratio of 0.6:0.3:1 | 120 |

8. A polymeric composition as claimed in claim 4, wherein the components are taken in the following ratio, in parts by mass:

| | |
|---|---|
| (polypropylene glycol)diurethanediepoxide | 100 |
| diglycidyl ether of bisphenol A | 150 |
| mixture of m-phenylenediamine and aniline | 40 |
| filler which is a mixture of talc and silica taken in the weight ratio of 0.8 to 0.2 | 150 |

9. A polymeric composition as claimed in claim 4, wherein the components are taken in the following ratio, in parts by mass:

| | |
|---|---|
| (polypropylene glycol)diurethanediepoxide | 100 |
| diglycidyl ether of bisphenol A | 40 |
| mixture of m-phenylenediamine and aniline | 19 |
| filler which is portland cement | 150 |

* * * * *